(12) United States Patent
Bahrami

(10) Patent No.: US 10,662,843 B2
(45) Date of Patent: May 26, 2020

(54) EXHAUST AFTER-TREATMENT SYSTEM AND METHOD WITH DUAL CLOSED-LOOP REDUCTANT DOSING SYSTEMS

(71) Applicant: Cummins Emission Solutions, Inc., Columbus, IN (US)

(72) Inventor: Behnam Bahrami, Indianapolis, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 652 days.

(21) Appl. No.: 15/317,052

(22) PCT Filed: Jul. 18, 2014

(86) PCT No.: PCT/US2014/047197
§ 371 (c)(1),
(2) Date: Dec. 7, 2016

(87) PCT Pub. No.: WO2016/010558
PCT Pub. Date: Jan. 21, 2016

(65) Prior Publication Data
US 2017/0122159 A1    May 4, 2017

(51) Int. Cl.
*F01N 3/035*    (2006.01)
*F01N 3/10*    (2006.01)
(Continued)

(52) U.S. Cl.
CPC .............. *F01N 3/035* (2013.01); *F01N 3/103* (2013.01); *F01N 3/106* (2013.01); *F01N 3/208* (2013.01);
(Continued)

(58) Field of Classification Search
CPC ........ F01N 3/206; F01N 3/2066; F01N 3/208; F01N 2610/01; F01N 2610/02;
(Continued)

(56) References Cited

U.S. PATENT DOCUMENTS

| 7,210,288 B2 | 5/2007 | Bandl-Konrad et al. |
| 2007/0122317 A1* | 5/2007 | Driscoll ................ B01D 53/90 |
| | | 422/170 |

(Continued)

FOREIGN PATENT DOCUMENTS

| CN | 101321575 A | 12/2008 |
| CN | 102325580 A | 1/2012 |

(Continued)

OTHER PUBLICATIONS

International Search Report and Written Opinion of the International Searching Authority issued in PCT/US2014/047197, dated Nov. 21, 2014.

(Continued)

*Primary Examiner* — Mark A Laurenzi
*Assistant Examiner* — Mickey H France
(74) *Attorney, Agent, or Firm* — Foley & Lardner LLP

(57) ABSTRACT

Exhaust after-treatment systems and methods are disclosed. An example system includes a selective catalytic reduction on filter (SCRF) and a selective catalytic reduction (SCR) catalyst positioned downstream of the SCRF. The system also includes a first reductant doser positioned upstream of the SCRF and a second reductant doser positioned downstream of the SCRF and upstream of the SCR catalyst. The system further includes first and second nitrogen oxide ($NO_x$) sensors positioned upstream of the first reductant doser, a third $NO_x$ sensor positioned downstream of the SCRF and upstream of the second reductant doser, and a catalyst positioned upstream of the first reductant doser.

25 Claims, 6 Drawing Sheets

(51) Int. Cl.
*F01N 3/20* (2006.01)
*F01N 11/00* (2006.01)
*F01N 3/021* (2006.01)

(52) U.S. Cl.
CPC .......... *F01N 3/2066* (2013.01); *F01N 11/007* (2013.01); *F01N 3/021* (2013.01); *F01N 2560/021* (2013.01); *F01N 2560/026* (2013.01); *F01N 2560/06* (2013.01); *F01N 2560/08* (2013.01); *F01N 2560/14* (2013.01); *F01N 2610/02* (2013.01); *F01N 2610/1453* (2013.01); *Y02T 10/24* (2013.01)

(58) Field of Classification Search
CPC ......... F01N 2610/06; F01N 2610/1453; F01N 2610/146; F01N 2560/14; F01N 2560/026; F01N 2560/06; F01N 2560/08; F01N 2560/021; F01N 11/007; Y02T 10/24
USPC ......... 60/272, 273, 274, 276, 282, 286, 287, 60/295, 301, 303
See application file for complete search history.

(56) References Cited

U.S. PATENT DOCUMENTS

| | | | |
|---|---|---|---|
| 2010/0024397 A1* | 2/2010 | Chi | F01N 3/106 60/285 |
| 2010/0098612 A1 | 4/2010 | Lee et al. | |
| 2010/0180579 A1 | 7/2010 | Huang et al. | |
| 2010/0180580 A1* | 7/2010 | Boorse | F01N 3/035 60/297 |
| 2011/0162347 A1 | 7/2011 | Katare et al. | |
| 2011/0265452 A1* | 11/2011 | Geveci | F01N 3/208 60/274 |
| 2012/0047877 A1 | 3/2012 | Winkler et al. | |
| 2012/0186229 A1 | 7/2012 | Phillips et al. | |
| 2013/0116881 A1 | 5/2013 | Bogema et al. | |
| 2013/0219867 A1 | 8/2013 | Gady et al. | |
| 2013/0298528 A1 | 11/2013 | Ramamurthy | |
| 2014/0054392 A1 | 2/2014 | Hao | |
| 2016/0298514 A1* | 10/2016 | Raux | F01N 3/208 |

FOREIGN PATENT DOCUMENTS

| | | |
|---|---|---|
| CN | 102345486 A | 2/2012 |
| CN | 20296444 U | 6/2013 |
| EP | 2 078 141 A2 | 7/2009 |
| EP | 2 131 020 A2 | 12/2009 |
| EP | 2 597 279 | 5/2013 |
| WO | WO 2011/139969 A1 | 11/2011 |

OTHER PUBLICATIONS

First Office Action Issued for Chinese Patent Application No. 201480080214.2, dated Aug. 20, 2018, 19, pages.
First Examination Report issued for Indian Patent Application No. 201647043614, dated Aug. 26, 2019, 6 pages.
Office Action in U.K. Application No. GB 1700724.6, dated Feb. 21, 2020.

* cited by examiner

US 10,662,843 B2

EXHAUST AFTER-TREATMENT SYSTEM AND METHOD WITH DUAL CLOSED-LOOP REDUCTANT DOSING SYSTEMS

CROSS REFERENCE TO RELATED APPLICATIONS

The present application is a U.S. National Stage of PCT Patent Application No. PCT/US2014/047197, filed Jul. 18, 2014, and the contents of which are incorporated herein by reference in its entirety.

TECHNICAL FIELD

The present disclosure relates generally to the field of internal combustion engine exhaust after-treatment systems.

BACKGROUND

In general, regulated emissions for internal combustion (IC) engines include carbon monoxide (CO), hydrocarbons (HC), nitrogen oxides ($NO_x$), and particulates. However, such regulations have become more stringent over recent years. For example, the regulated emissions of $NO_x$ and particulates from diesel-powered IC engines are low enough that, in many cases, the emissions levels cannot be met with improved combustion technologies alone. To that end, exhaust after-treatment systems are increasingly utilized to reduce the levels of harmful exhaust emissions present in exhaust gas.

Conventional exhaust gas after-treatment systems include any of several different components to reduce the levels of harmful exhaust emissions present in exhaust gas. For example, certain exhaust after-treatment systems for diesel-powered IC engines include various components, such as a diesel oxidation catalyst (DOC), a selective catalytic reduction (SCR) catalyst, a diesel particulate filter (DPF), an SCR on filter (SCRF), and/or an ammonia slip catalyst (ASC) (also referred to as an ammonia oxidation catalyst (AMOX)). Each of the DOC, SCR catalyst, DPF, SCRF, and/or the ASC components are configured to perform a particular exhaust emissions treatment operation on the exhaust gas passing through or over the respective components.

Generally, DOCs reduce the amount of CO and HC present in the exhaust gas via oxidation techniques, as well as to convert NO to $NO_2$ for passive regeneration of soot on a DPF and to facilitate fast SCR reactions. DPFs filter harmful diesel particulate matter and soot present in the exhaust gas. SCR catalysts and SCRFs have been developed to remove $NO_x$ from the exhaust gas, which is relatively more difficult to remove than CO, HC and particulate matter.

SCR catalysts are configured to convert $NO_x$ (NO and $NO_2$ in some fraction) into harmless nitrogen gas ($N_2$) and water vapor ($H_2O$). A reductant (typically ammonia ($NH_3$) in some form) is added to the exhaust gas upstream of the catalyst. The $NO_x$ and ammonia pass over the catalyst and a catalytic reaction takes place in which $NO_x$ and ammonia are converted into $N_2$ and $H_2O$. An SCRF is an assembly that performs the combined functions of an SCR and a DPF.

In most conventional SCR and SCRF systems, ammonia is used as a reductant. Typically, pure ammonia is not directly used due to safety concerns, expense, weight, lack of infrastructure, and other factors. Instead, many conventional systems utilize diesel exhaust fluid (DEF), which typically is a urea-water solution. To convert the DEF into ammonia, the DEF is injected into a decomposition tube through which an exhaust stream flows. The injected DEF spray is heated by the exhaust gas stream to trigger the decomposition of urea into ammonia. The exhaust gas mixture including the ammonia decomposed from the urea further mixes while flowing through the decomposition tube and passes over the SCR catalyst (e.g., SCR "brick"), where the $NO_x$ and ammonia are converted to $N_2$ and $H_2O$.

For optimal SCR and SCRF systems, a specific amount of reductant is applied to the exhaust gas at each instant such that all of the ammonia decomposed from the reductant, or applied directly to the exhaust gas, converts all of the $NO_x$ present in the exhaust gas at that instant to $N_2$, $H_2O$, and a small amount of $N_2O$. If too little ammonia is applied, the exhaust gas will retain high levels of $NO_x$. However, if more ammonia is applied than is necessary to convert all of the $NO_x$, ammonia leakage, or "slip" from the SCR catalyst may occur. In this case, the ammonia slip either converts to $N_2$ and $NO_x$ over the ASC or is discharged (e.g., "slips") from the tailpipe into the environment. Ammonia slip is undesirable because ammonia and $NO_x$ are caustic and harmful to the environment. In addition, ammonia slip indicates that excessive reductant is being dosed, which is wasteful and inefficient, resulting in higher operating costs.

Conventional exhaust after-treatment systems utilize various control methods for controlling the operation of a reductant doser in an after-treatment system. However, conventional systems have slow response times and perform poorly in cold temperatures and during transient periods. Thus, there is a need for improved exhaust after-treatment systems.

SUMMARY

Various embodiments relate to an exhaust after-treatment system. The exhaust after-treatment system includes SCRF and a selective catalytic reduction (SCR) catalyst positioned downstream of the SCRF. The system also includes a first reductant doser positioned upstream of the SCRF and a second reductant doser positioned downstream of the SCRF and upstream of the SCR catalyst. The system further includes first and second nitrogen oxide ($NO_x$) sensors positioned upstream of the first reductant doser, a third $NO_x$ sensor positioned downstream of the SCRF and upstream of the second reductant doser, and a catalyst positioned upstream of the first reductant doser.

Other embodiments relate to an exhaust after-treatment system including a first closed-loop reductant dosing system and a second closed-loop reductant dosing system positioned downstream of the first closed-loop reductant dosing system. The first closed-loop reductant dosing system includes a first after-treatment component positioned upstream of a first reductant doser and a second after-treatment component positioned downstream of the first reductant doser. The second closed-loop reductant dosing system includes a second reductant doser and a third after-treatment component positioned downstream of the second reductant doser. In certain embodiments, the first after-treatment component comprises an SCRF, and the second after-treatment component comprises an SCR catalyst.

Further embodiments relate to a method for reducing $NO_x$ in exhaust gas from an internal combustion engine. The method includes measuring a first level of $NO_x$ present in exhaust gas upstream of an oxidation catalyst, a second level of $NO_x$ present in the exhaust gas downstream of the oxidation catalyst and upstream of a first reductant doser, and a third level of $NO_x$ present in the exhaust gas downstream of an SCRF and upstream of a second reductant doser. The SCRF is positioned downstream of the first reductant doser. The amount of reductant dispensed from the first reductant doser is controlled based on the first, second, and third measured levels of $NO_x$ present in the exhaust gas. The method also includes measuring a fourth level of $NO_x$ present in the exhaust gas downstream of an SCR catalyst. The SCR catalyst is positioned downstream of the second reductant doser. An amount of reductant dispensed from the second reductant doser is controlled based on the third and fourth measured levels of $NO_x$ present in the exhaust gas.

Other embodiments relate to a system for reducing nitrogen oxides in exhaust gas from an internal combustion engine. The system includes a controller which includes a measurement module, a first reductant doser control module, and a second reductant doser control module. The measurement module is configured to measure a first level of $NO_x$ present in exhaust gas upstream of a first reductant doser, a second level of $NO_x$ present in the exhaust gas downstream of the first after-treatment component and upstream of a second reductant doser, and a third level of $NO_x$ present in the exhaust gas downstream of the second after-treatment component. The first reductant doser control module is configured to control an amount of reductant dispensed from the first reductant doser based on the first and second measured levels of $NO_x$ present in the exhaust gas. The second reductant doser control module is configured to control an amount of reductant dispensed from the second reductant doser based on the second and third measured levels of $NO_x$ present in the exhaust gas.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
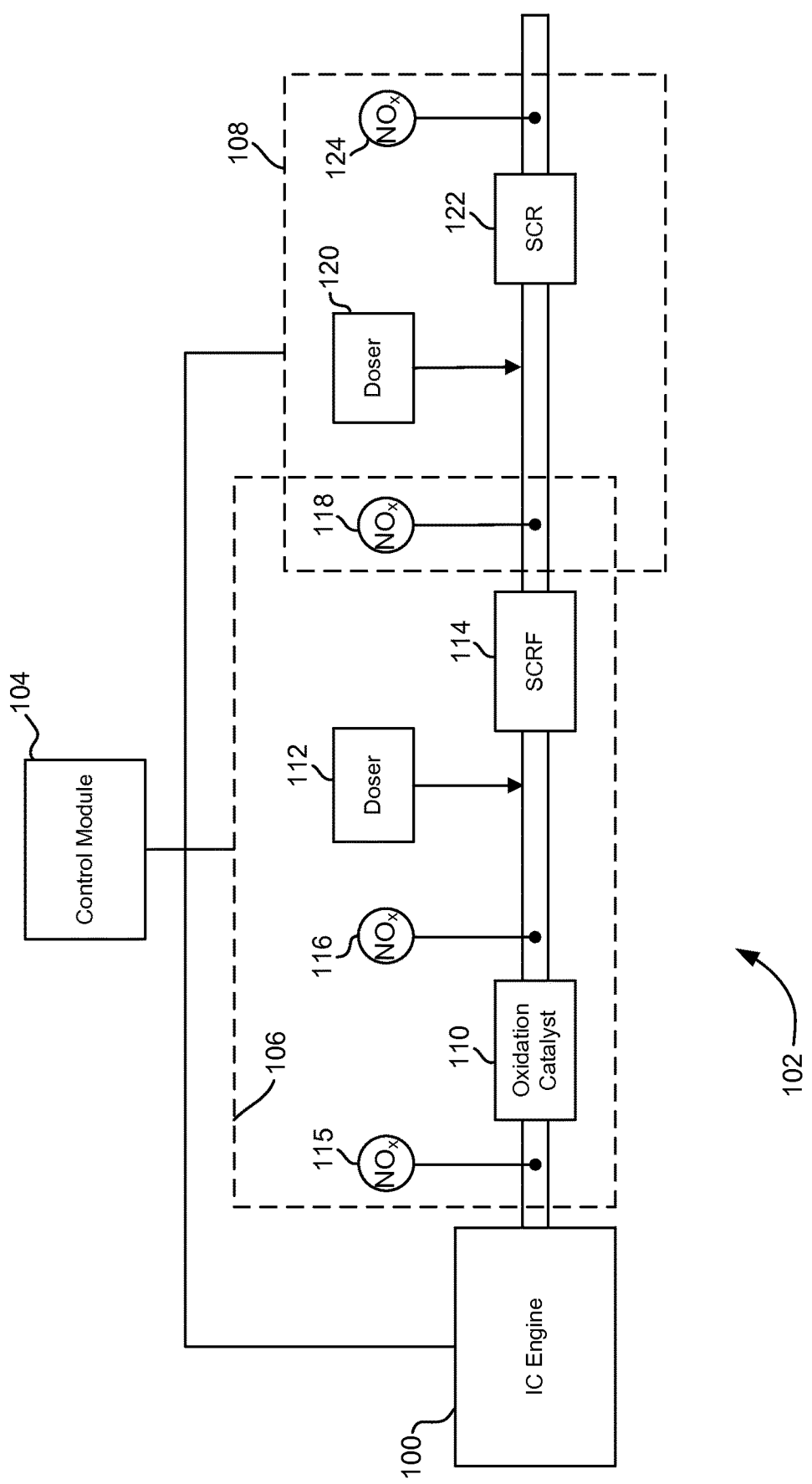
FIG. 1 is a block diagram of an exhaust after-treatment system according to an exemplary embodiment.

Exhaust after-treatment systems for internal combustion (IC) engines utilize various components to reduce the amount of harmful chemicals and particulate matter in exhaust gas emissions. For example, certain exhaust after-treatment systems include a reductant doser and an SCR catalyst to remove nitrogen oxides ($NO_x$) from exhaust gas. The reductant doser sprays a reductant (typically ammonia ($NH_3$) in some form) into the exhaust gas upstream of the SCR catalyst. The ammonia mixes with $NO_x$ within the exhaust gas and passes over a catalyst bed of the SCR catalyst, where a catalytic reaction takes place in which NO is converted into harmless nitrogen gas ($N_2$) and water vapor ($H_2O$).

In terms of controlling optimal reductant dosing levels (e.g., reductant feed rate), the dosing ideally results in the stoichiometric ratio of ammonia to $NO_x$ at each instant. In other words, the exact amount of reductant is dosed at each instant such that the ammonia from the reductant converts all of the $NO_x$ present in the exhaust gas to nitrogen and water vapor. If too little reductant is dosed, the exhaust gas will retain high levels of $NO_x$. However, if too much reductant is dosed, unreacted ammonia will pass through the SCR catalyst, which is referred to as ammonia slip. As noted previously, ammonia slip is undesirable because ammonia may either completely convert to $N_2$ and $NO_x$ over an ASC and/or some portion of the ammonia may be discharged to the environment. Either situation is undesirable because both ammonia and $NO_x$ are harmful to the environment. In addition, ammonia slip is an indicator that excessive reductant is being dosed, which is wasteful and inefficient, resulting in higher operating costs.

Reductant dosing control may be challenging due to numerous external factors that affect $NO_x$ conversion. Such external factors include the behavior of additional exhaust after-treatment components, temperature, component degradation, and engine transients, among others. For example, exhaust after-treatment systems often include an oxidation catalyst (e.g., a DOC) to remove carbon monoxide (CO) and hydrocarbons (HC). However, certain oxidation catalysts (e.g., cold-start catalysts) adsorb $NO_x$ at low temperatures and desorb $NO_x$ at high temperatures. In addition, intermittent temperature spikes can cause rapid $NO_x$ desorption. Thus, optimal reductant dosage accounts for the effects that external components have on $NO_x$ levels, such as adsorption and desorption.

Temperature can also affect SCR catalyst operation. SCR catalysts may adsorb ammonia at low temperatures and desorb ammonia at high temperatures. In addition, at low temperatures, a reductant (e.g., ammonia) may not fully decompose into ammonia and/or $NO_x$ may not fully reduce to $N_2$. Exhaust after-treatment components (e.g., catalysts) may also degrade over time and/or may become fouled with particulate matter build-up, which can affect $NO_x$ conversion. Furthermore, engine transients can affect the exhaust gas flow rate, $NO_x$ concentration, and exhaust temperature, among other things.

Conventional exhaust gas after-treatment systems utilize various control systems to control reductant dosage. Certain conventional systems utilize a standard reductant/fuel consumption ratio (e.g., 3-5% DEF/fuel consumption ratio). Other systems utilize time delays and/or look-up tables calibrated for various operating scenarios, such as cold-start. Although certain conventional systems may meet current emissions requirements, many are incapable of meeting the strict emissions standards that will be required in the years to come.

Exhaust after-treatment systems in accordance with exemplary embodiments described herein include two closed-loop reductant dosing systems. By utilizing two closed-loop dosing systems, the exhaust after-treatment system can achieve improved performance and efficiency over conventional after-treatment systems. For example, advantages of the exhaust after-treatment system including two closed-loop dosing systems include (1) nearly 100 percent conversion of $NO_x$ to nitrogen; (2) substantially lower low ammonia slip; (3) improved cold-start performance; (4) faster response time to transient events; and (5) reduced reductant usage, among others.

FIG. 1 illustrates an IC engine 100 and an exhaust after-treatment system 102 fluidly coupled to an exhaust manifold (not shown) of the IC engine 100, according to an exemplary embodiment. The IC engine 100 can be a compression-ignited IC engine, such as a diesel or compressed natural gas fueled engine, or a spark-ignited internal combustion engine, such as a gasoline fueled engine operating lean. A control module 104 is operatively coupled to the IC engine 100 and to each of the components within the exhaust after-treatment system 102. The control module 104 receives measurement signals from various sensors and other components within the IC engine 100 and the exhaust after-treatment system 102, among other components. The control module 104 is configured to analyze the received signals and to generate control signals to control the IC engine 100, the exhaust after-treatment system 102, among other components. In certain examples, the control module 104 is incorporated into an engine control module. However, the control module 104 can be incorporated into any number of combined or discrete modules.

During operation, the IC engine 100 expels exhaust gas, which flows downstream from the IC engine 100 through the exhaust gas after-treatment system 102. Generally, the exhaust gas after-treatment system 102 is configured to remove various chemical and particulate emissions present in the exhaust gas.

The exhaust after-treatment system 102 includes a first closed-loop dosing system 106 and a second closed-loop dosing system 108 positioned downstream of the first closed-loop dosing system 106. Each of the first and the second closed-loop dosing systems 106, 108 are configured to measure NO levels upstream of a reductant doser and to measure NO levels downstream of an SCR catalyst positioned downstream of the doser. By comparing NO levels both upstream and downstream of the reductant doser and the catalyst, the systems provide closed-loop reductant dosing control. Closed-loop control allows the dosing systems to dynamically adjust dosing based on the system's actual dynamic response. The exhaust after-treatment system 102 is particularly beneficial for IC engines that produce high levels of $NO_x$, which is particularly prevalent with IC engines that are optimized for high fuel economy.

The first closed-loop dosing system 106 includes an oxidation catalyst 110, a first reductant doser 112 positioned downstream of the oxidation catalyst 110, and an SCRF 114 downstream of the first reductant doser 112. The SCRF 114 comprises an SCR catalyst with an integrated particulate filter. The first closed-loop dosing system 106 also includes various sensors, including a first $NO_x$ sensor 115 positioned downstream of the IC engine 100 and upstream of the oxidation catalyst 110, a second $NO_x$ sensor 116 positioned upstream of the first reductant doser 112 and downstream of the oxidation catalyst 110, and a third $NO_x$ sensor 118 positioned downstream of the SCRF 114.

The second closed-loop dosing system 108 includes a second reductant doser 120 and a first SCR catalyst 122 positioned downstream of the second reductant doser 120. The second closed-loop dosing system 108 also utilizes the third $NO_x$ sensor 118 of the first closed-loop dosing system 106 and further includes a fourth $NO_x$ sensor 124 positioned downstream of the first SCR catalyst 122.

The second closed-loop dosing system 108 is configured to reduce the minimal amount of $NO_x$ that may pass through the first closed-loop dosing system 106. Thus, the exhaust after-treatment system 102 is capable of achieving nearly 100% $NO_x$ conversion and, therefore, is capable of meeting and exceeding strict exhaust emissions standards that will be required well into the future.

The first and second closed-loop dosing systems 106, 108 are considered to be closed-loop systems because they measure the input $NO_x$ level upstream of each of the dosers and measure the output $NO_x$ level downstream of each of the catalysts (e.g., the SCRF 114 or the first SCR catalyst 122), and adjust the amount of reductant dispensed by each of the dosers to reach the desired output $NO_x$ level (e.g., zero). Thus, each of the first and second closed-loop systems 106, 108 automatically account for any external factors that affect $NO_x$ levels or that affect the efficacy of the reductant. In addition to adjusting dosing based on feedback from the $NO_x$ sensors downstream of each of the catalysts, the first and second closed-loop dosing systems 106, 108 also utilize feed-forward control by anticipating changes in $NO_x$ levels based on measurements from the $NO_x$ sensors upstream of each of the dosers. Thus, the first and second closed-loop dosing systems 106, 108 dynamically adjust dosing based on the actual system response, thereby providing superior performance over conventional control systems, such as those utilizing discrete calibration profiles.

In certain exemplary embodiments, the oxidation catalyst 110 may include one or more of a DOC, a $NO_x$ absorber catalyst (NAC), or a cold start catalyst, among other types of catalysts. Generally, DOCs are configured to reduce unburned hydrocarbons (HCs) and carbon monoxide (CO) present in the exhaust gas. However, NACs and cold start catalysts are configured to adsorb $NO_x$ at low temperatures (e.g., 100-150 degrees C.) and desorb $NO_x$ at high temperatures (e.g., 200-300 degrees C.). Thus, potential $NO_x$ adsorption and desorption by the oxidation catalyst 110 in certain examples is another variable to be considered by the first closed-loop dosing system 106. In certain exemplary embodiments, the first closed-loop dosing system 106 anticipates $NO_x$ adsorption and desorption by the oxidation catalyst 110, and adjusts dosing accordingly.

Figure 2:
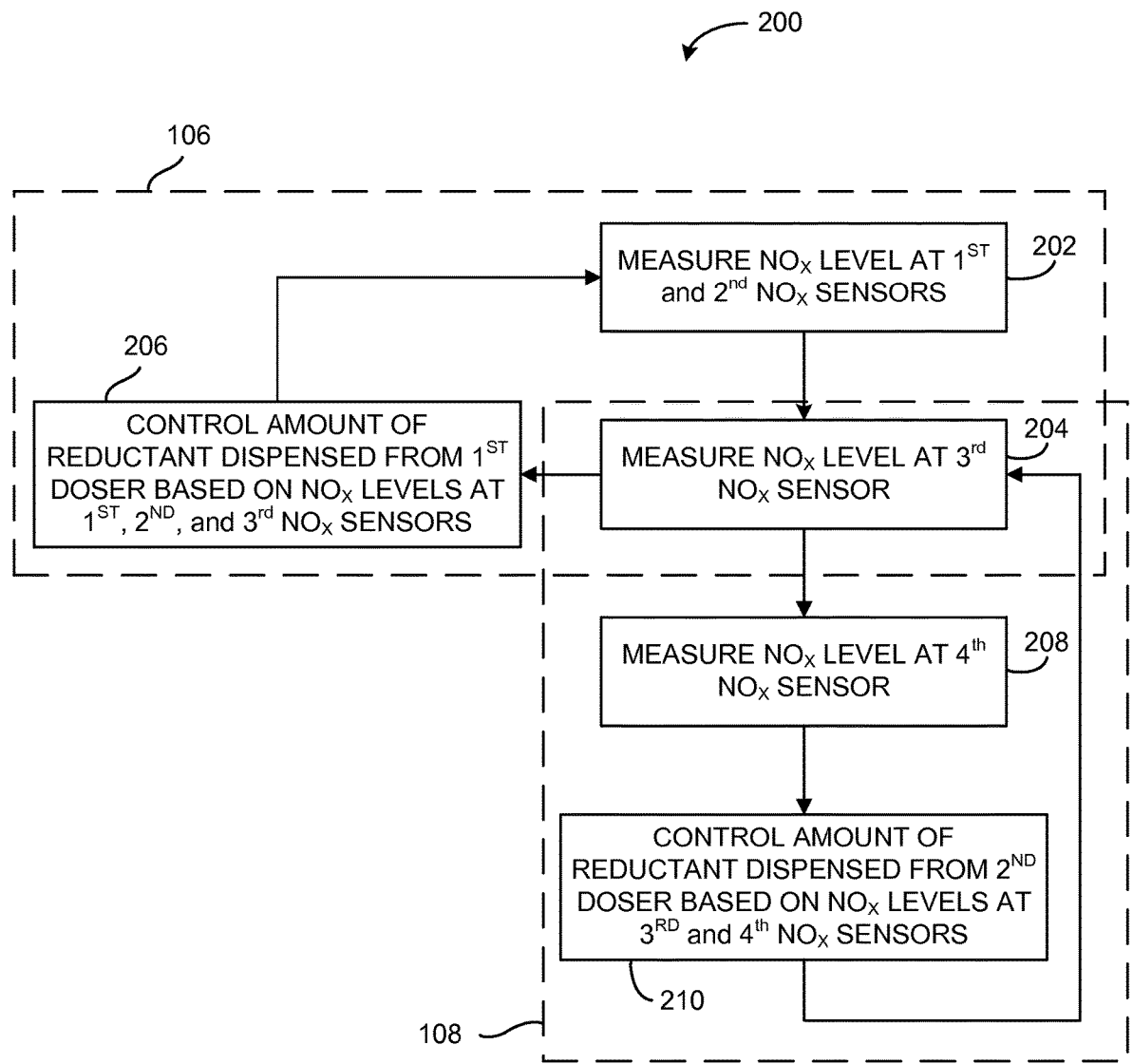
FIG. 2 is a flow diagram illustrating a method of operation of the exhaust after-treatment system of FIG. 1.

FIG. 2 is a flow diagram illustrating a method of operation of the exhaust after-treatment system 102 of FIG. 1. In operation, the IC engine 100 expels exhaust gas, which flows downstream through the first closed-loop dosing system 106 of the exhaust gas after-treatment system 102. At 202, the first and second $NO_x$ sensors 115, 116 measure the level of NO in the exhaust gas passing over them and transmit their measurements to the control module 104. At 204, the third $NO_x$ sensor 118 measures the level of $NO_x$ in the exhaust gas passing over it and transmits its measurements to the control module 104.

At 206, the control module 104 compares the measurements of the first, second, and third $NO_x$ sensors 115, 116, 118 and controls the amount of reductant dispensed by the first reductant doser 112 based on those measurements. For example, the control module 104 may command the first reductant doser 112 to dispense more reductant if the third $NO_x$ sensor 118 measures high levels of $NO_x$. The first closed-loop dosing system 106 continually measures the NO levels at the first, second, and third $NO_x$ sensors 115, 116, 118 and controls the amount of reductant dispensed by the first reductant doser 112 based on those measurements.

The second closed-loop dosing system 108 also utilizes the NO level measured by the third $NO_x$ sensor 118 at 204.

At 208, the fourth $NO_x$ sensor 124 measures the level of NO in the exhaust gas passing over it and transmits its measurements to the control module 104. At 210, the control module 104 compares the measurements of the third $NO_x$ sensor 118, which it measured in connection with the first closed-loop dosing system 106, and the fourth $NO_x$ sensor 124, and controls the amount of reductant dispensed by the second reductant doser 120 based on those measurements.

For example, the control module 104 may command the second reductant doser 120 to dispense more reductant if the fourth $NO_x$ sensor 124 measures high levels of $NO_x$. The second closed-loop dosing system 108 continually measures the NO levels at the third and fourth $NO_x$ sensors 118, 124 and controls the amount of reductant dispensed by the second reductant doser 120 based on those measurements.

Figure 3:
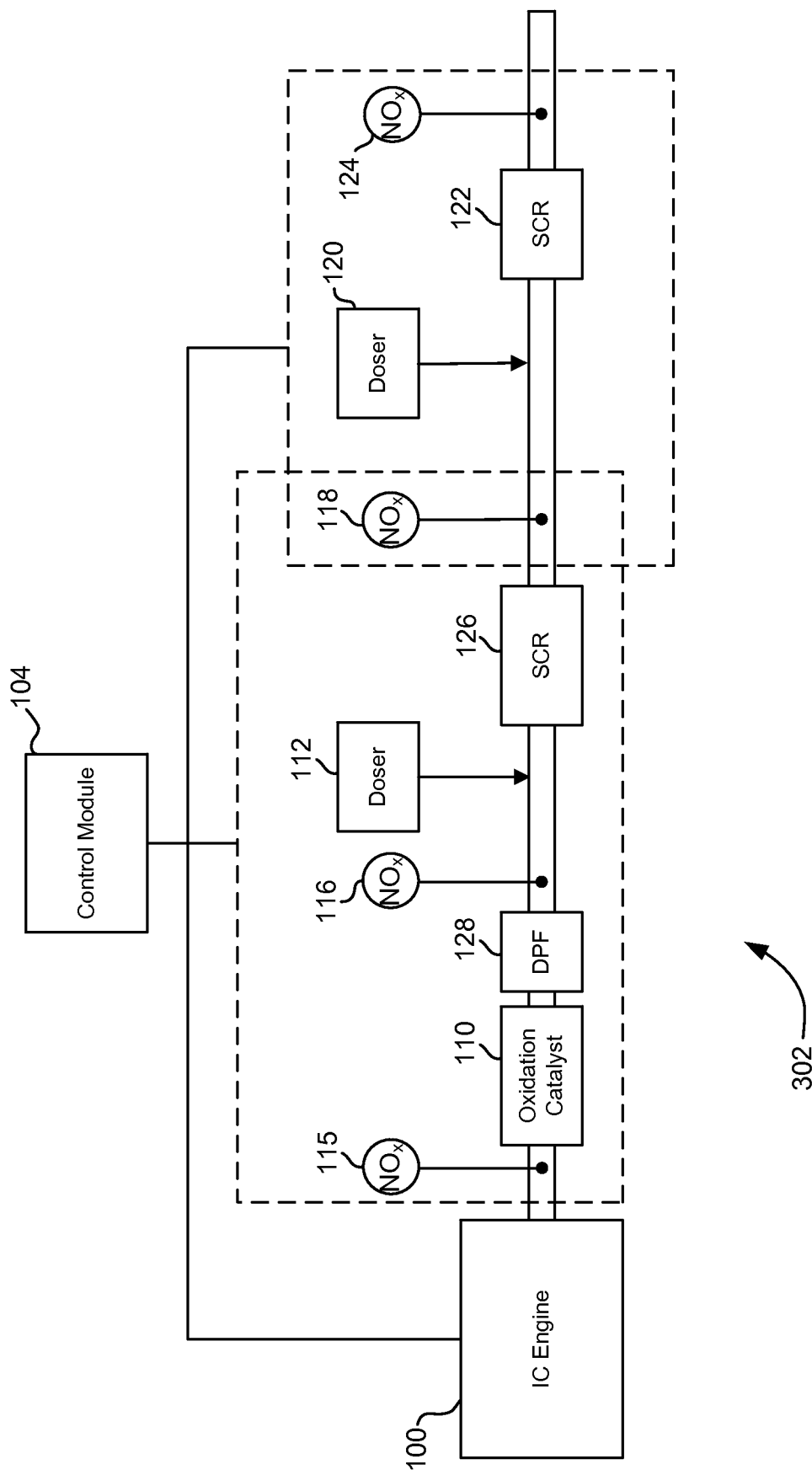
FIG. 3 is a block diagram of an exhaust after-treatment system according to a second exemplary embodiment.

FIG. 3 illustrates an exhaust gas after-treatment system 302 according to a second exemplary embodiment. The exhaust gas after-treatment system 302 is similar to the exhaust gas after-treatment 102 of FIG. 1, except that the SCRF 114 is replaced by a second SCR catalyst 126 positioned downstream of the first reductant doser 112 and upstream of the third $NO_x$ sensor 118, and by a DPF 128 that is positioned downstream of the oxidation catalyst 110 and upstream of the second $NO_x$ sensor 116. The exhaust gas after-treatment system 302 may be desirable as a low-cost alternative to the exhaust gas after-treatment system 102 of FIG. 1. However, during cold-start conditions and when the exhaust heat is warming up, the DPF 128 may act as a heat sink and remove heat from the exhaust gas. This may be detrimental to the second SCR catalyst 126, which requires a certain minimum heat to operate properly. Therefore, the exhaust gas after-treatment system 102 of FIG. 1 including the SCRF 114 may be desirable in certain situations because the SCRF 114 can be positioned closer to the IC engine 100 than the second SCR catalyst 126.

The first and second reductant dosers 112, 120 can be configured to dispense various types of reductants. In one exemplary embodiment, each of the first and second reductant dosers 112, 120 are configured to dispense diesel exhaust fluid (DEF). In another embodiment, the first reductant doser 112 is configured to dispense DEF and the second reductant doser 120 is configured to dispense gaseous ammonia. In a further embodiment, each of the first and second reductant dosers 112, 120 are configured to dispense gaseous ammonia.

DEF is conventionally preferred over gaseous ammonia due to its low cost, wide availability, and relative safety during dispensing and storage. However, DEF has poor low-temperature performance because it must be heated to a particular temperature to be decomposed into ammonia. In addition, systems utilizing DEF exhibit response lag due to the time required to decompose DEF into ammonia. Further, catalyst preload may be slower in systems that utilize DEF than those that utilize gaseous ammonia. Thus, gaseous ammonia provides certain performance advantages over DEF.

As mentioned above, the first closed-loop dosing system 106 eliminates the majority of the $NO_x$ present in the exhaust gas and the second closed-loop dosing system 108 eliminates the small amount of $NO_x$ that escapes the first closed-loop dosing system 106. Therefore, the second closed-loop dosing system 108 can be sized much smaller than the first closed-loop dosing system 106. Accordingly, the embodiment in which the first reductant doser 112 dispenses DEF and the second reductant doser 120 dispenses gaseous ammonia may be economically feasible for applications for which gaseous ammonia is conventionally cost-prohibitive. Such systems provide the cold-start and response time benefits of gaseous ammonia dosing, as well as the low cost and convenience of DEF dosing. In certain examples, such systems can be configured to disable the first reductant doser 112 and enable the second reductant doser 120 at low temperatures (e.g., during cold-start periods) such that gaseous ammonia is dispensed, and to enable the first reductant doser 112 and disable the second reductant doser 120 at higher temperatures (e.g., during normal operation) such that DEF is dispensed. In other examples, both of the first and second reductant dosers 112, 120 are enabled at higher temperatures.

In embodiments that utilize both DEF and gaseous ammonia, it is desirable to position the gaseous ammonia doser downstream of the DEF doser because exhaust gas loses heat as it flows downstream. The high heat required to convert DEF to ammonia is not required when gaseous ammonia is utilized directly.

Figure 4:
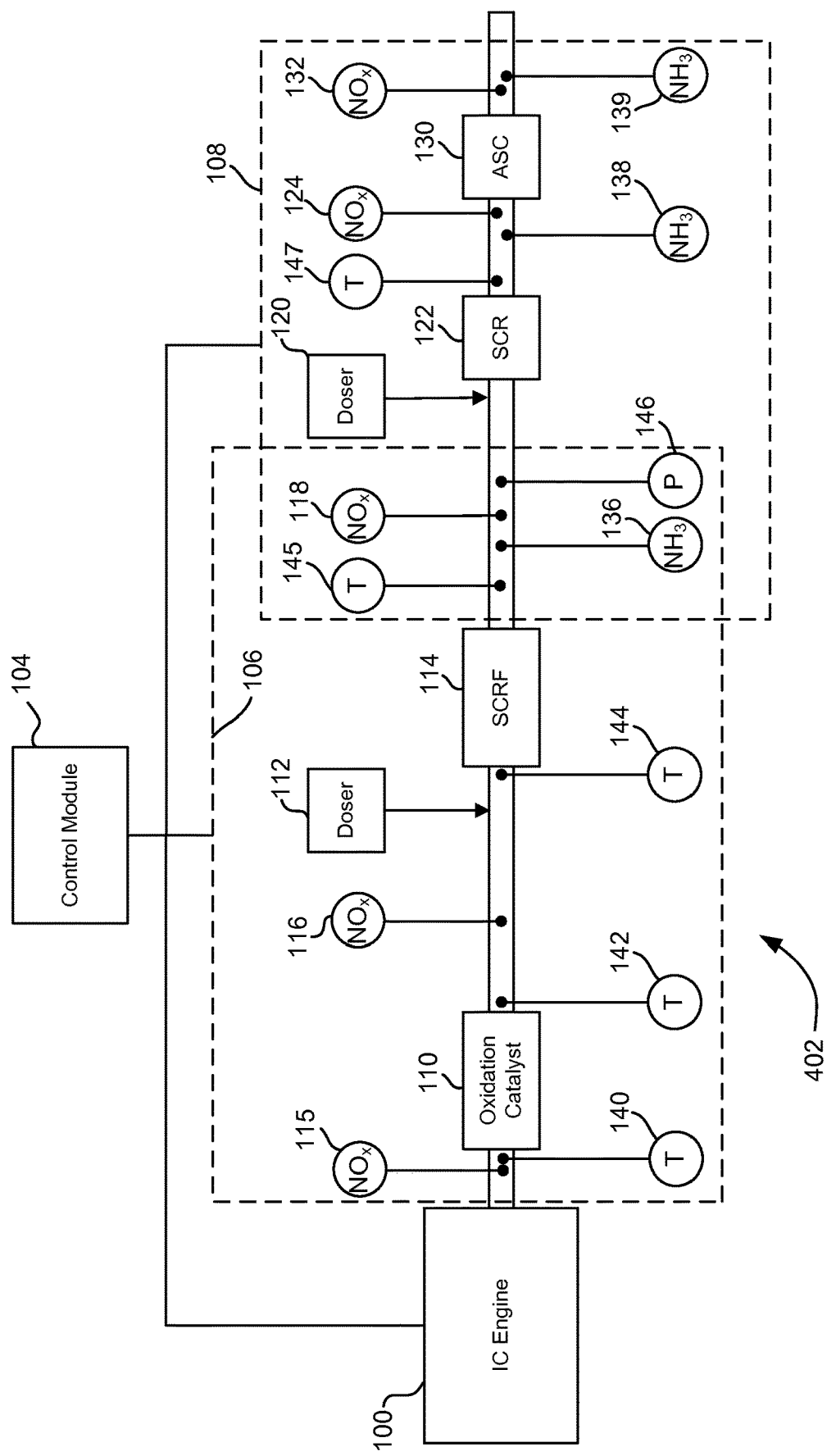
FIG. 4 is a block diagram of an exhaust after-treatment system according to a third exemplary embodiment.

FIG. 4 illustrates an exhaust gas after-treatment system 402 according to a third exemplary embodiment. This embodiment further includes additional sensors and an ammonia slip catalyst (ASC) 130 positioned downstream of the first SCR catalyst 122. The ASC 130 is configured to remove any ammonia that may slip from the first SCR catalyst 122. Thus, the ASC 130 can be smaller than those in conventional systems because by using two closed-loop dosing systems, there will be very little, if any, ammonia left in the system after the first SCR catalyst 122 that must be catalyzed by the ASC 130. This can amount to significant cost-savings, as the ASC 130 utilizes precious metals.

The exhaust gas after-treatment system 402 also includes a fifth $NO_x$ sensor 132 positioned downstream of the ASC 130 to provide additional feedback regarding the $NO_x$ levels exiting the downstream end of the exhaust gas after-treatment system 402.

The exhaust gas after-treatment system 402 further includes a first ammonia sensor 136 positioned downstream of the SCRF 114 and upstream of the second reductant doser 120, a second ammonia sensor 138 positioned downstream of the first SCR catalyst 122 and upstream of the ASC 130, and a third ammonia sensor 139 positioned downstream of the ASC 130. The first, second, and third ammonia sensors 136, 138, 139 provide feedback regarding ammonia levels after the SCRF 114, the first SCR catalyst 122, and the ASC 130, respectively, which improves dosing control for the first and second reductant dosers 112, 120. For example, the control module 104 may command the first reductant doser 112 to dispense less reductant if the first ammonia sensor 136 senses high levels of ammonia. The first ammonia sensor 136 also provides feed-forward information for the second closed-loop dosing system 108.

The exhaust gas after-treatment system 402 also includes a first temperature sensor 140 positioned upstream of the oxidation catalyst 110, a second temperature sensor 142 positioned downstream of the oxidation catalyst 110 and upstream of the first reductant doser 112, a third temperature sensor 144 positioned downstream of the first reductant doser 112 and upstream of the SCRF 114, a fourth temperature sensor 145 and a pressure sensor 146 positioned downstream of the SCRF 114 and upstream of the second reductant doser 120, and a fifth temperature sensor 147 positioned downstream of the first SCR catalyst 122 and upstream of the ASC 130. These sensors provide additional feedback and feed-forward control for the first and second closed-loop dosing systems 106, 108 of the exhaust after-treatment system 402. In some configurations, two temperature sensors, namely, the second and third temperature sensors 142, 144 are included between the oxidation catalyst 110 and the SCRF 114 because there may be a significant distance between these components. It should be understood that the particular configurations of the various sensors of the exhaust after-treatment systems 102, 302, and 402 are merely exemplary. Certain embodiments will include more or fewer sensors positioned in similar or different arrangements, in accordance with the spirit and scope of this disclosure.

By utilizing two closed-loop control systems, the system is capable of reacting to various transient and steady-state conditions to operate at maximum efficiency. One example is during start-up periods in which the IC engine 100 and, accordingly, the exhaust gas flowing through the exhaust gas after-treatment system 302 is warming up. The SCRF 114 has a high amount of wash coat (e.g., catalyst), such that the catalyst adsorbs ammonia at low temperatures and desorbs ammonia at high temperatures. At high temperatures (e.g., as measured by one or more of the first, second, third, fourth, and fifth temperature sensors 140, 142, 144, 145, and 147), the first ammonia sensor 136 can sense the high amount of ammonia that is being desorbed by the SCRF 114. Accordingly, the control module 104 can reduce the amount of reductant that is dispensed by the first reductant doser 112 and adjust the amount of reductant that is dispensed by the second reductant doser 120 based on the amount of $NO_x$ measured by the second $NO_x$ sensor 118 and the amount of ammonia measured by the first, second, and third ammonia sensors 136, 138, 139, to avoid over-dosing ammonia due to ammonia being adsorbed and later desorbed by the SCRF 114.

Figure 5:
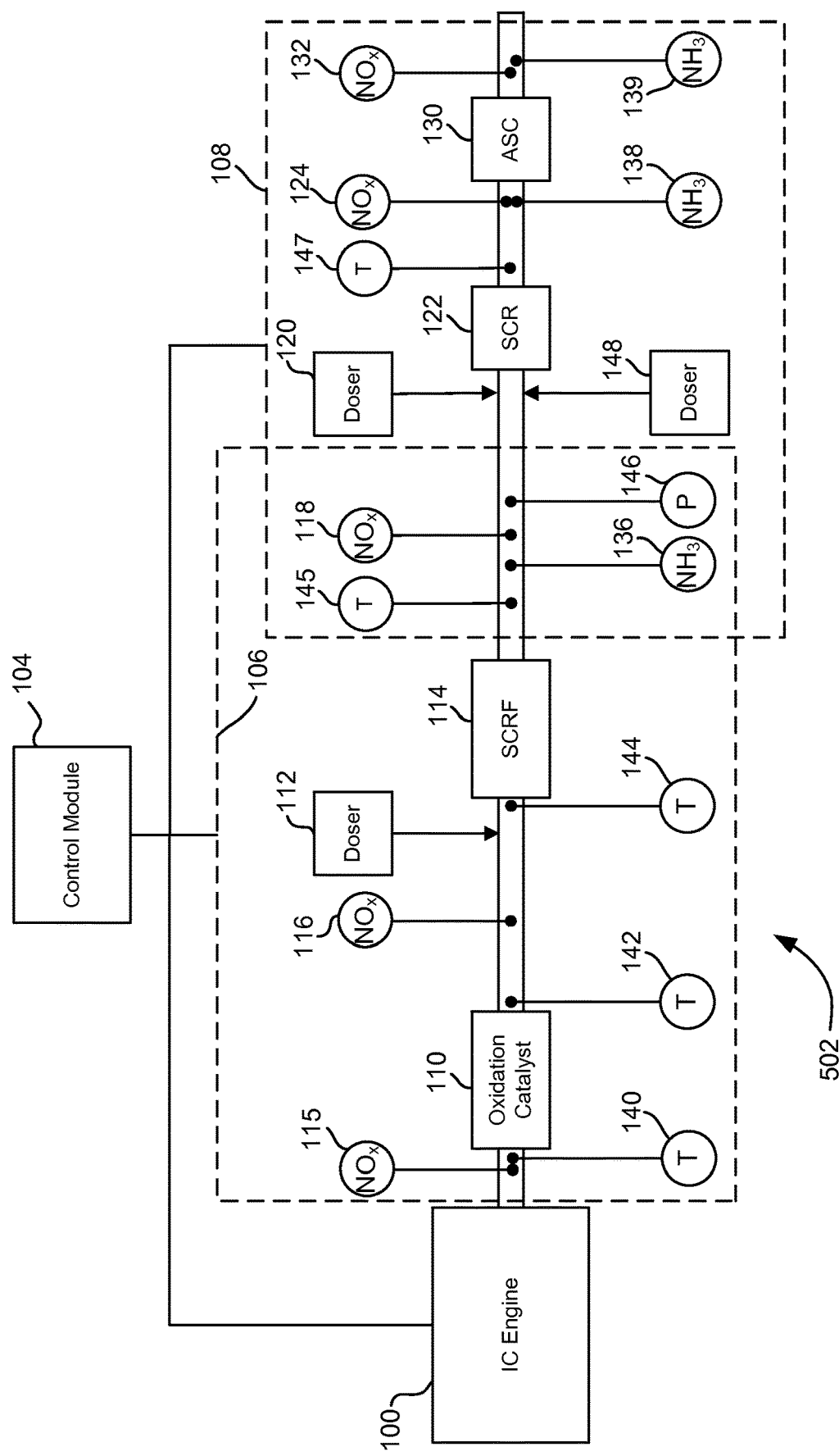
FIG. 5 is a block diagram of an exhaust after-treatment system according to a fourth exemplary embodiment.

FIG. 5 illustrates an exhaust gas after-treatment system 502 according to a fourth exemplary embodiment. The exhaust gas after-treatment system 502 is similar to the exhaust gas after-treatment 402 of FIG. 4, except that it further includes a third reductant doser 148 positioned near the second reductant doser 120, downstream of the SCRF 114 and upstream of the first SCR catalyst 122. In certain examples, the third reductant doser 148 is a gaseous ammonia doser and the second reductant doser 120 is a DEF doser. The control module 104 can be configured to deactivate the second reductant doser 120 and to activate the third reductant doser 148 at cold temperatures (e.g., during cold-start), and to activate the second reductant doser 120 and to deactivate the third reductant doser 148 at higher temperatures (e.g., during normal operation). Thus, the system would conserve the gaseous ammonia by only using it at cold temperatures at which DEF is ineffective, and switching to the cheaper and more readily available DEF at higher temperatures. Such control logic may consider measurements from any of the plurality of sensors, and/or an amount of time since the engine was started. Such a system exhibits superior cold-start performance compared to conventional systems.

It should be noted that the terms "example" and "exemplary" as used herein to describe various embodiments are intended to indicate that such embodiments are possible examples, representations, and/or illustrations of possible embodiments (and such terms are not intended to connote that such embodiments are necessarily extraordinary or superlative examples).

Figure 6:
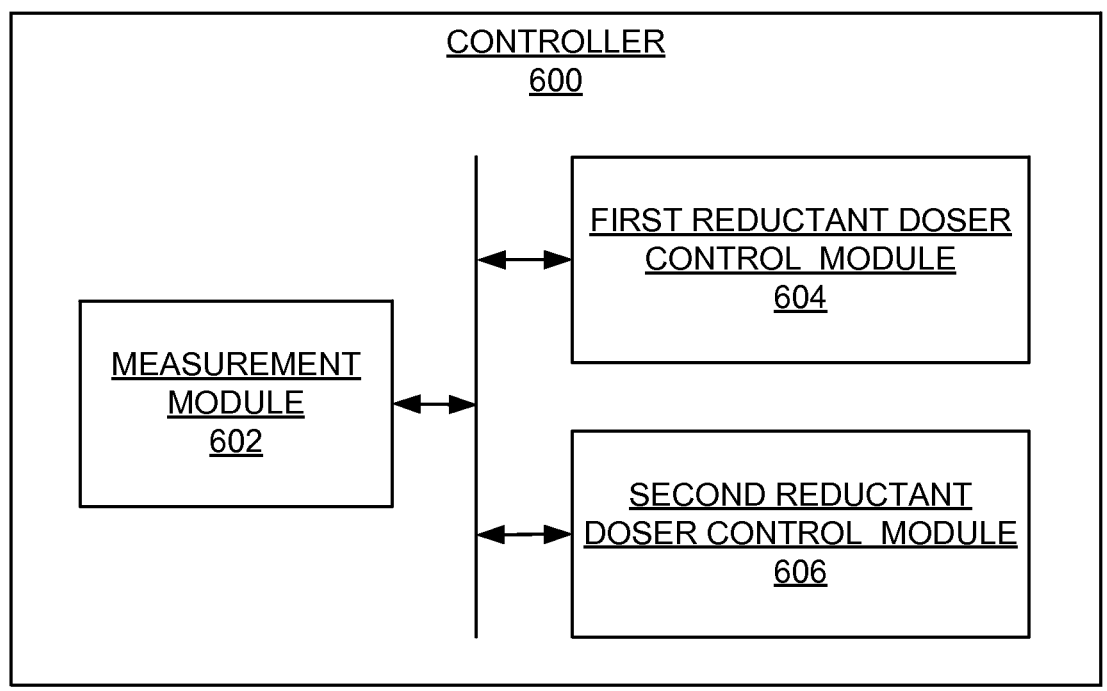
FIG. 6 is a block diagram of a control system for controlling an exhaust after-treatment system.

FIG. 6 is a representation of a control system for controlling an exhaust after-treatment system in accordance with example embodiments. The exhaust after-treatment control system includes a controller 600 structured to perform certain operations to control one or more reductant dosers of an exhaust after-treatment system. In certain embodiments, the controller 600 forms a portion of a processing subsystem including one or more computing devices having memory, processing, and communication hardware. The controller 600 may be a single device or a distributed device, and the functions of the controller 600 may be performed by hardware and/or as computer instructions on a non-transient computer readable storage medium.

In certain embodiments, the controller 600 includes one or more modules structured to functionally execute the operations of the controller. As shown in FIG. 6, the controller 600 may include one or more measurement modules 602 configured to measure various exhaust gas conditions within an exhaust after-treatment system. In particular embodiments, the one or more measurement modules 602 may be configured to determine an exhaust gas condition, including, but not limited to one or more of a first level of $NO_x$ and a first temperature downstream of an IC engine and upstream of a first after-treatment component; a second temperature and a second level of $NO_x$ downstream of the first after-treatment component and upstream of a first reductant doser; a second temperature downstream of the first reductant doser and upstream of a second after-treatment component; a fourth temperature, a third level of $NO_x$, a first level of ammonia and a pressure downstream of the second after-treatment component and upstream of a second reductant doser; a fifth temperature, a fourth level of $NO_x$, and a second level of ammonia downstream of the third after-treatment component and upstream of a fourth after-treatment component; and a fifth level of $NO_x$ downstream of the fifth after-treatment components.

In certain embodiments, the controller 600 also includes first and second reductant doser control modules 604, 606 communicatively coupled to the at least one measurement module 602. The first and second reductant doser control modules 604, 606 are configured to cause transmission of respective first and second reductant doser control signals to cause respective first and second reductant dosers of the exhaust gas after-treatment system to dispense reductant at least in part in response to a determination based on the exhaust gas condition signals, such as the first, second, third, fourth, and fifth levels of $NO_x$; the first and second levels of ammonia; the first, second, third, fourth, and fifth temperatures of the exhaust gas; and the pressure of the exhaust gas, among others.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 1. Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

While various embodiments of the disclosure have been shown and described, it is understood that these embodiments are not limited thereto. The embodiments may be

What is claimed is:

1. An exhaust after-treatment system, comprising:
a selective catalytic reduction on filter (SCRF);
a selective catalytic reduction (SCR) catalyst positioned downstream of the SCRF;
a first reductant doser positioned upstream of the SCRF;
a second reductant doser positioned downstream of the SCRF and upstream of the SCR catalyst;
first and second nitrogen oxide (NOx) sensors positioned upstream of the first reductant doser;
a third NOx sensor positioned downstream of the SCRF and upstream of the second reductant doser;
a fourth NOx sensor positioned downstream of the SCR catalyst;
a first closed-loop feedback controller configured to control reductant dosage from the first reductant doser based on measurements from the first, second, and third NOx sensors; and
a second closed-loop feedback controller configured to control reductant dosage from the second reductant doser based on measurements from the third NOx sensor and the fourth NOx sensor.

2. The exhaust after-treatment system of claim 1, further comprising an oxidation catalyst positioned downstream of the first NOx sensor and upstream of the second NOx sensor and the first reductant doser, the oxidation catalyst comprising one of a diesel oxidation catalyst (DOC), a NOx absorber catalyst (NAC), or a cold-start catalyst.

3. The exhaust after-treatment system of claim 2, further comprising a first ammonia sensor positioned downstream of the SCRF and upstream of the second reductant doser, wherein the first closed-loop feedback controller is further configured to control reductant dosage from the first reductant doser based on measurements from the first ammonia sensor.

4. The exhaust after-treatment system of claim 3, further comprising:
a first temperature sensor positioned upstream of the oxidation catalyst;
a second temperature sensor positioned downstream of the oxidation catalyst and upstream of the first reductant doser;
a third temperature sensor positioned downstream of the first reductant doser and upstream of the SCRF;
a fourth temperature sensor positioned downstream of the SCRF and upstream of the second reductant doser; and
a pressure sensor positioned downstream of the SCRF and upstream of the second reductant doser,
wherein the first closed-loop feedback controller is further configured to control reductant dosage from the first reductant doser based on measurements from the first, second, third, and fourth temperature sensors and from the pressure sensor.

5. The exhaust after-treatment system of claim 4, further comprising a second ammonia sensor positioned downstream of the SCR catalyst, wherein the second closed-loop feedback controller is further configured to control reductant dosage from the second reductant doser based on measurements from the first and second ammonia sensors.

6. The exhaust after-treatment system of claim 4, further comprising an ammonia slip catalyst (ASC) positioned downstream of the SCR catalyst.

7. The exhaust after-treatment system of claim 6, further comprising a fifth NOx sensor positioned downstream of the ASC, and wherein the second closed-loop feedback controller is further configured to control reductant dosage from the second reductant doser based on measurements from the fifth NOx sensor.

8. The exhaust after-treatment system of claim 7, further comprising a fifth temperature sensor positioned downstream of the SCR catalyst and upstream of the ASC, and wherein the second closed-loop feedback controller is further configured to control reductant dosage from the second reductant doser based on measurements from the fourth and fifth temperature sensors and from the pressure sensor.

9. The exhaust after-treatment system of claim 5, further comprising a third reductant doser positioned downstream of the SCRF and upstream of the SCR catalyst, the third reductant doser configured to dispense gaseous ammonia.

10. The exhaust after-treatment system of claim 9, wherein:
at exhaust gas temperatures, as measured by at least one of the first temperature sensor, the second temperature sensor, the third temperature sensor, or the fourth temperature sensor, below a predetermined threshold, the second reductant doser is deactivated and the third reductant doser is activated; and
at exhaust gas temperatures, as measured by at least one of the first temperature sensor, the second temperature sensor, the third temperature sensor, or the fourth temperature sensor, above a predetermined threshold, the second reductant doser is activated and the third reductant doser is deactivated.

11. The exhaust after-treatment system of claim 1, wherein the first reductant doser is configured to dispense diesel exhaust fluid (DEF) and the second reductant doser is configured to dispense gaseous ammonia.

12. The exhaust after-treatment system of claim 1, wherein each of the first and second reductant dosers is configured to dispense gaseous ammonia.

13. A method for reducing nitrogen oxide in exhaust gas from an internal combustion engine, the method comprising:
measuring a first level of nitrogen oxide (NOx) present in exhaust gas upstream of an oxidation catalyst;
measuring a second level of NOx present in the exhaust gas downstream of the oxidation catalyst and upstream of a first reductant doser;
measuring a third level of NOx present in the exhaust gas downstream of a selective catalytic reduction on filter (SCRF) and upstream of a second reductant doser, the SCRF being positioned downstream of the first reductant doser;
controlling an amount of reductant dispensed from the first reductant doser based on the first, second, and third measured levels of NOx present in the exhaust gas;
measuring a fourth level of NOx present in the exhaust gas downstream of a selective catalytic reduction (SCR) catalyst, the SCR catalyst being positioned downstream of the second reductant doser; and
controlling an amount of reductant dispensed from the second reductant doser based on the third and fourth measured levels of NOx present in the exhaust gas.

14. The method of claim 13, further comprising:
measuring a first level of ammonia present in the exhaust gas downstream of the SCRF and upstream of the second reductant doser;
measuring a first temperature upstream of the oxidation catalyst;

measuring a second temperature downstream of the oxidation catalyst and upstream of the first reductant doser;

measuring a third temperature downstream of the first reductant doser and upstream of the SCRF; and measuring a fourth temperature and a pressure downstream of the SCRF and upstream of the second reductant doser, wherein the controlling of the amount of reductant dispensed from the first reductant doser is further based on at least one of the first measured level of ammonia, the first, second, third, and fourth temperatures, and the pressure.

15. The method of claim 14, further comprising:

measuring a second level of ammonia present in the exhaust gas downstream of the SCR catalyst and a fifth temperature downstream of the first SCR catalyst, wherein the controlling of the amount of reductant dispensed from the second reductant doser is further based on the second measured level of ammonia, the fourth and fifth temperatures, and the pressure.

16. The method of claim 15, further comprising:

measuring a fifth level of NOx present in the exhaust gas downstream of an ammonia slip catalyst (ASC), the ASC being positioned downstream of the SCR catalyst and wherein the third measured level of NOx and the fifth temperature are measured upstream of the ASC, and wherein the controlling of the amount of reductant dispensed from the second reductant doser is further based on the fourth measured level of NOx present in the exhaust gas.

17. The method of claim 15, further comprising:

if at least one of the first, second, third, fourth, and fifth temperatures is below a predetermined threshold, deactivating the second reductant doser and activating a third reductant doser, the third reductant doser being positioned downstream of the SCRF and upstream of the SCR catalyst; and if at least one of the first, second, third, fourth, and fifth temperatures is above a predetermined threshold, activating the second reductant doser and deactivating the third reductant doser.

18. The method of claim 17, wherein the second reductant doser is configured to dispense diesel exhaust fluid and the third reductant doser is configured to dispense gaseous ammonia.

19. A system for reducing nitrogen oxide in exhaust gas from an internal combustion engine, comprising:

a controller, including:

a measurement module configured to measure:

a first level of nitrogen oxide (NOx) present in exhaust gas upstream of a first reductant doser and downstream of an oxidation catalyst disposed upstream of the first reductant doser, a second level of NOx present in the exhaust gas downstream of a first after-treatment component and upstream of a second reductant doser, the first after-treatment component comprising at least one of a selective catalytic reduction on filter (SCRF) system and a selective catalytic reduction (SCR) system, and a third level of NOx present in the exhaust gas downstream of a second after-treatment component, the second aftertreatment system comprising a selective catalytic reduction (SCR) system;

a first reductant doser control module configured to control an amount of reductant dispensed from the first reductant doser based on the first and second measured levels of NOx present in the exhaust gas; and a second reductant doser control module configured to control an amount of reductant dispensed from the second reductant doser based on the second and third measured levels of NOx present in the exhaust gas.

20. The system of claim 19, wherein the measurement module is further configured to measure a first level of ammonia present in the exhaust gas downstream of the first after-treatment component and upstream of the second reductant doser, and a second level of ammonia present in the exhaust gas downstream of the second after-treatment component, wherein the first reductant doser control module is further configured to control the amount of reductant dispensed from the first reductant doser based on the first measured level of ammonia present in the exhaust gas, and wherein the second reductant doser control module is further configured to control the amount of reductant dispensed from the second reductant doser based on the second measured level of ammonia present in the exhaust gas.

21. The system of claim 20, wherein the measurement module is further configured to measure a fourth level of NOx present in the exhaust gas downstream of an ammonia slip catalyst (ASC), the ASC being positioned downstream of the second after-treatment component and wherein the third measured level of NOx is measured upstream of the ASC, and wherein the second reductant doser control module is further configured to control the amount of reductant dispensed from the second reductant doser further based on the fourth measured level of NOx present in the exhaust gas.

22. The system of claim 21, wherein the measurement module is further configured to measure a temperature of the exhaust gas by one or more of a first temperature sensor positioned upstream of the oxidation catalyst, a second temperature sensor positioned downstream of the oxidation catalyst and upstream of the first reductant doser, a third temperature sensor downstream of the first reductant doser and upstream of the selective catalytic reduction on filter, or a fourth temperature sensor downstream of the selective catalytic reduction on filter, and wherein the first reductant doser control module is further configured to control the amount of reductant dispensed from the first reductant doser is further based on a fifth measured level of NOx present in the exhaust gas.

23. The system of claim 20, wherein the measurement module is further configured to measure a temperature of the exhaust gas by one or more of a first temperature sensor positioned upstream of the oxidation catalyst, a second temperature sensor positioned downstream of the oxidation catalyst and upstream of the first reductant doser, a third temperature sensor downstream of the first reductant doser and upstream of the selective catalytic reduction on filter, or a fourth temperature sensor downstream of the selective catalytic reduction on filter, and wherein the second reductant doser control module is further configured to:

deactivate the second reductant doser and activate a third reductant doser if the temperature is below a predetermined threshold, the third reductant doser being positioned downstream of the first after-treatment component and upstream of the second after-treatment component, and activate the second reductant doser and deactivate the third reductant doser if the temperature is above a predetermined threshold.

24. An exhaust after-treatment system, comprising:
a first selective catalytic reduction (SCR) catalyst;
a second SCR catalyst;
a first reductant doser positioned upstream of the first SCR;
a diesel particulate filter positioned upstream of the first reductant doser;
a second reductant doser positioned downstream of the first SCR catalyst and upstream of the second SCR catalyst;
first and second nitrogen oxide (NOx) sensors positioned upstream of the first reductant doser;
a third NOx sensor positioned downstream of the first SCR catalyst and upstream of the second reductant doser;
a fourth NOx sensor positioned downstream of the second SCR catalyst;
a first closed-loop feedback controller configured to control reductant dosage from the first reductant doser based on measurements from the first, second, and third NOx sensors; and
a second closed-loop feedback controller configured to control reductant dosage from the second reductant doser based on measurements from the third NOx sensor and the fourth NOx sensor.

25. A system for reducing nitrogen oxide in exhaust gas from an internal combustion engine, comprising:
a controller, including:
a measurement module configured to measure:
a first level of nitrogen oxide (NOx) present in exhaust gas upstream of a first reductant doser,
a second level of NOx present in the exhaust gas downstream of a first after-treatment component and upstream of a second reductant doser, the first after-treatment component comprising one of a selective catalytic reduction on filter (SCRF) system and a selective catalytic reduction (SCR) system, and
a third level of NOx present in the exhaust gas downstream of a second aftertreatment component, the second aftertreatment component comprising a selective catalytic reduction (SCR) system;
a first reductant doser control module configured to control an amount of reductant dispensed from the first reductant doser based on the first and second measured levels of NOx present in the exhaust gas; and
a second reductant doser control module configured to control an amount of reductant dispensed from the second reductant doser based on the second and third measured levels of NOx present in the exhaust gas,
wherein the measurement module is further configured to measure a first level of ammonia present in the exhaust gas downstream of the first after-treatment component and upstream of the second reductant doser, and a second level of ammonia present in the exhaust gas downstream of the second after-treatment component,
wherein the first reductant doser control module is further configured to control the amount of reductant dispensed from the first reductant doser based on the first measured level of ammonia present in the exhaust gas,
wherein the second reductant doser control module is further configured to control the amount of reductant dispensed from the second reductant doser based on the second measured level of ammonia present in the exhaust gas,
wherein the measurement module is further configured to measure a temperature of the exhaust gas by one or more of a first temperature sensor positioned upstream of the oxidation catalyst, a second temperature sensor positioned downstream of the oxidation catalyst and upstream of the first reductant doser, a third temperature sensor downstream of the first reductant doser and upstream of the selective catalytic reduction on filter, or a fourth temperature sensor downstream of the selective catalytic reduction on filter, and
wherein the second reductant doser control module is further configured to: deactivate the second reductant doser and activate a third reductant doser if the temperature is below a predetermined threshold, the third reductant doser being positioned downstream of the first after-treatment component and upstream of the second after-treatment component, and activate the second reductant doser and deactivate the third reductant doser if the temperature is above a predetermined threshold.

* * * * *